US011671787B2

(12) United States Patent
Roberts et al.

(10) Patent No.: US 11,671,787 B2
(45) Date of Patent: *Jun. 6, 2023

(54) LIGHT MANAGEMENT SYSTEM FOR WIRELESS ENABLED FIXTURE

(71) Applicant: IDEAL Industries Lighting LLC, Racine, WI (US)

(72) Inventors: John Roberts, Durham, NC (US); James McBryde, Raleigh, NC (US)

(73) Assignee: IDEAL Industries Lighting LLC, Sycamore, IL (US)

( * ) Notice: Subject to any disclaimer, the term of this patent is extended or adjusted under 35 U.S.C. 154(b) by 31 days.

This patent is subject to a terminal disclaimer.

(21) Appl. No.: 17/385,005

(22) Filed: Jul. 26, 2021

(65) Prior Publication Data

US 2021/0352436 A1 Nov. 11, 2021

Related U.S. Application Data

(63) Continuation of application No. 16/824,905, filed on Mar. 20, 2020, now Pat. No. 11,076,471, which is a
(Continued)

(51) Int. Cl.
*H04W 4/02* (2018.01)
*H04W 4/029* (2018.01)
(Continued)

(52) U.S. Cl.
CPC .......... *H04W 4/023* (2013.01); *H04W 4/029* (2018.02); *H04W 4/50* (2018.02); *H04W 4/80* (2018.02); *H05B 47/19* (2020.01); *H05B 47/195* (2020.01)

(58) Field of Classification Search
CPC ....... H05B 47/195; H05B 47/19; H04W 4/80; H04W 4/50; H04W 4/029; H04W 4/023
See application file for complete search history.

(56) References Cited

U.S. PATENT DOCUMENTS

| 9,750,112 B2 | 8/2017 | Deese et al. |
| 2011/0031897 A1* | 2/2011 | Henig .................... H05B 47/18 315/297 |

(Continued)

OTHER PUBLICATIONS

Author Unknown, "Bluetooth Specification Version 4.2," in Specification of the Bluetooth® System, Covered Core Package version: 4.2, Dec. 2, 2014, Bluetooth SIG Proprietary, 2772 pages.

(Continued)

*Primary Examiner* — Raymond R Chai
(74) *Attorney, Agent, or Firm* — Withrow & Terranova, P.L.L.C.

(57) ABSTRACT

A lighting management system includes communications circuitry, processing circuitry, and a memory. The memory stores instructions, which, when executed by the processing circuitry cause the lighting management system to receive a message from a lighting fixture via the communications circuitry, the message indicating a proximal presence of a detected mobile device to the lighting fixture, and performing one or more actions in response to receipt of the message. By performing the one or more actions upon receipt of the message as described above, a lighting system may be provided with additional functionality that enhances the lighting system.

21 Claims, 19 Drawing Sheets

Related U.S. Application Data continuation of application No. 14/827,007, filed on Aug. 14, 2015, now abandoned.

(51) Int. Cl.
*H04W 4/50* (2018.01)
*H04W 4/80* (2018.01)
*H05B 47/19* (2020.01)
*H05B 47/195* (2020.01)

(56) References Cited

U.S. PATENT DOCUMENTS

| | | | |
|---|---|---|---|
| 2011/0046792 A1 | 2/2011 | Imes et al. | |
| 2012/0038281 A1* | 2/2012 | Verfuerth | H05B 45/10 315/152 |
| 2014/0106735 A1 | 4/2014 | Jackson et al. | |
| 2014/0168610 A1* | 6/2014 | Spaulding | H05B 47/155 315/312 |
| 2014/0285113 A1* | 9/2014 | Huang | H05B 47/19 315/297 |
| 2015/0076993 A1* | 3/2015 | Mohan | H05B 47/11 315/153 |
| 2015/0112826 A1* | 4/2015 | Crutchfield, Jr. | G06Q 30/0643 705/26.1 |
| 2015/0120000 A1 | 4/2015 | Coffey et al. | |
| 2016/0073482 A1* | 3/2016 | Fok | H05B 47/19 315/294 |
| 2016/0127874 A1* | 5/2016 | Kingsmill | H04W 4/30 455/456.1 |
| 2016/0345414 A1* | 11/2016 | Nolan | H05B 47/19 |
| 2017/0034559 A1 | 2/2017 | Garner et al. | |
| 2017/0048952 A1 | 2/2017 | Roberts et al. | |
| 2017/0134521 A1* | 5/2017 | Keränen | H04L 5/0055 |

OTHER PUBLICATIONS

Non-Final Office Action for U.S. Appl. No. 14/827,007, dated Oct. 26, 2016, 8 pages.
Non-Final Office Action for U.S. Appl. No. 14/827,007, dated Mar. 2, 2017, 16 pages.
Final Office Action for U.S. Appl. No. 14/827,007, dated Jun. 20, 2017, 18 pages.
Advisory Action, Examiner-Initiated Interview Summary, and AFCP 2.0 Decision for U.S. Appl. No. 14/827,007, dated Sep. 18, 2017, 6 pages.
Non-Final Office Action for U.S. Appl. No. 14/827,007, dated Nov. 1, 2017, 15 pages.
Final Office Action for U.S. Appl. No. 14/827,007, dated Mar. 22, 2018, 16 pages.
Advisory Action for U.S. Appl. No. 14/827,007, dated Jun. 14, 2018, 3 pages.
Examiner's Answer for U.S. Appl. No. 14/827,007, dated Dec. 13, 2018, 7 pages.
Decision on Appeal for U.S. Appl. No. 14/827,007, dated Jan. 23, 2020, pages.
International Search Report and Written Opinion for International Patent Application No. PCT/US2016/046753, dated Oct. 25, 2016, 10 pages.
International Preliminary Report on Patentability for International Patent Application No. PCT/US2016/046753, dated Mar. 1, 2018, 7 pages.
Non-Final Office Action for U.S. Appl. No. 16/824,905, dated Sep. 1, 2020, 14 pages.
Final Office Action for U.S. Appl. No. 16/824,905, dated Dec. 11, 2020, 16 pages.
Applicant-Initiated Interview Summary for U.S. Appl. No. 16/824,905, dated Feb. 24, 2021, 4 pages.
Notice of Allowance for U.S. Appl. No. 16/824,905, dated Mar. 25, 2021, 8 pages.

\* cited by examiner

MOBILE DEVICES
MOBILE DEVICE 1
MOBILE DEVICE 2
MOBILE DEVICE 3

SUGGESTED SETTINGS

YOU NORMALLY TURN OFF THE BEDROOM LIGHTS AROUND 8:00 PM EVERY NIGHT. WOULD YOU LIKE THIS TO OCCUR AUTOMATICALLY IN THE FUTURE? [NO] [YES]

YOU NORMALLY DIM THE LIVING ROOM LIGHTS EVERY TIME YOU TURN ON THE TELEVISION AFTER 6:30 PM. WOULD YOU LIKE THIS TO OCCUR AUTOMATICALLY IN THE FUTURE? [NO] [YES]

*FIG. 15*

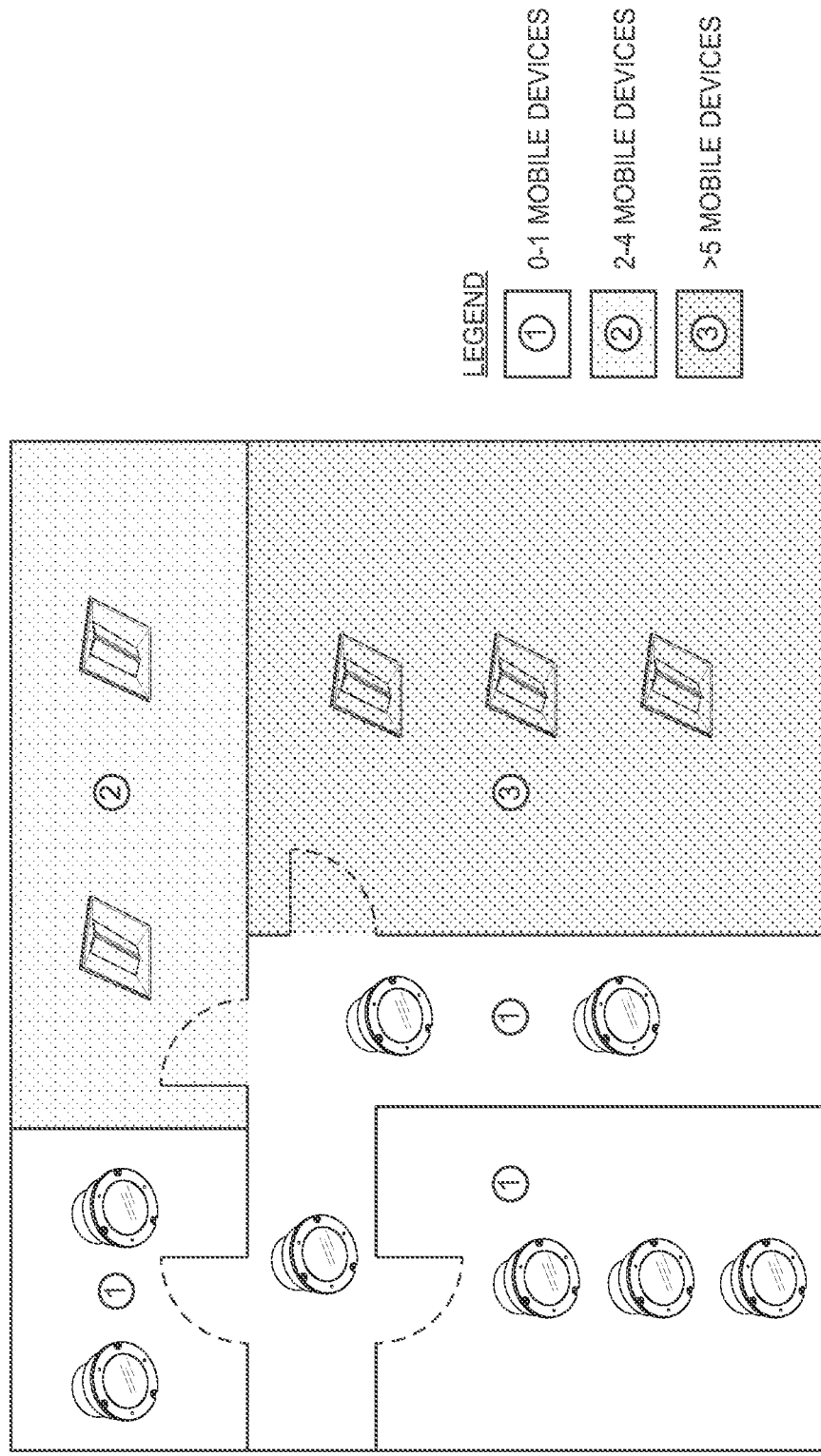

LIGHT MANAGEMENT SYSTEM FOR WIRELESS ENABLED FIXTURE

RELATED APPLICATION

This application is a continuation of U.S. patent application Ser. No. 16/824,905, filed Mar. 20, 2020, now U.S. Pat. No. 11,076,471, which is a continuation of U.S. patent application Ser. No. 14/827,007, filed Aug. 14, 2015, published as U.S. Patent Application Publication No. 2017/0048952 A1, the disclosures of which are hereby incorporated herein by reference in their entireties.

FIELD OF THE DISCLOSURE

The present disclosure relates to lighting fixtures and systems.

BACKGROUND

Modern lighting fixtures continue to evolve, incorporating features such as controllers, sensors, remote modules, and the like. These controllers, sensors, and remote modules may allow a lighting fixture to implement lighting programs, respond to the surrounding environment, and be controlled, for example, over a local area network and/or the Internet. Current lighting fixtures are generally controlled manually, by a user selecting one or more light output settings (e.g., light intensity, color, and/or color temperature) for a particular lighting fixture or lighting fixtures. While this may be accomplished using a portable device such as a smart phone, it is often inconvenient to manually adjust such settings.

Accordingly, there is a need for improved lighting fixtures and systems.

SUMMARY

The present disclosure relates to lighting fixtures and systems. In one embodiment, a lighting management system includes communications circuitry, processing circuitry, and a memory. The memory stores instructions, which, when executed by the processing circuitry cause the lighting management system to receive a message from a lighting fixture via the communications circuitry, the message indicating a proximal presence of a detected mobile device to the lighting fixture, and performing one or more actions in response to receipt of the message. By performing the one or more actions upon receipt of the message as described above, a lighting system may be provided with additional functionality that enhances the lighting system.

In one embodiment, the one or more actions include logging an event indicating the detection of the proximal presence of the detected mobile device by the lighting fixture.

In one embodiment, the lighting fixture is associated with fixture location information describing a location of the lighting fixture. The message may therefore include mobile device distance information describing a distance of the detected mobile device relative to the lighting fixture. Logging the event indicating the detection of the proximal presence of the detected mobile device to the lighting fixture may therefore include storing a time that the detected mobile device was detected by the lighting fixture and the mobile device distance information. In one embodiment, the memory stores further instructions, which, when executed by the processing circuitry cause the lighting management system to instruct a display to provide a user interface displaying a visual representation showing an approximate location of the detected mobile device with relation to the lighting fixture over time. The visual representation may be an indicator on a map. In one embodiment, the user interface may display a number of detected mobile devices and/or a frequency of detection of the one or more mobile devices.

In one embodiment, the one or more actions include determining if the detected mobile device is associated with a settings profile indicating one or more desired actions to be taken upon detection of the proximal presence of the detected mobile device, and implementing the one or more desired actions if there is an associated settings profile. All or a portion of the one or more desired actions may be forwarded to one or more lighting fixtures. The one or more desired actions may include an action to adjust one or more light output parameters of one or more lighting fixtures.

In one embodiment, the lighting management system may receive one or more messages from each of a number of lighting fixtures whose location is known, each one of the messages indicating a proximal presence of a detected mobile device to the lighting fixture, and analyze the messages to determine an approximate location of the detected mobile device.

In one embodiment, a lighting fixture includes a light source, a housing coupled to the light source, communications circuitry, and control circuitry. The housing includes an opening through which light from the light source is provided. The communications circuitry is configured to detect a proximal presence of one or more mobile devices. The control circuitry includes a memory storing instructions, which, when executed by the control circuitry cause the lighting fixture to adjust one or more light output parameters of the light source, detect the proximal presence of one or more mobile devices via the communications circuitry, and perform one or more actions in response to the detection of the proximal presence of a detected mobile device. By performing one or more actions in response to the proximal presence of a detected mobile device, a lighting fixture may intelligently and conveniently adapt to a user.

In one embodiment, the one or more actions include determining if the detected mobile device is associated with a settings profile indicating one or more desired actions to be taken upon detection of the proximal presence of the detected mobile device, and performing the one or more desired actions indicated by the settings profile in response to determining that the detected mobile device is associated with a settings profile.

In one embodiment, the one or more light output parameters include a light intensity, a color, and a color temperature.

In one embodiment, the one or more actions include broadcasting a message via the communications circuitry to one or more additional lighting fixtures, wherein the message indicates the proximal presence of the detected mobile device to the lighting fixture. In one embodiment, the message is broadcast to a lighting management system.

In one embodiment, the communications circuitry includes Bluetooth communications circuitry. Accordingly, the lighting fixture may be configured to detect the proximal presence of one or more mobile devices by determining a received signal strength of a Bluetooth wireless communications signal from each one of the one or more mobile devices.

In one embodiment, the memory stores further instructions, which, when executed by the control circuitry cause the lighting fixture to estimate a distance from the lighting fixture to the detected mobile device.

In one embodiment, a lighting fixture includes a light source, a housing coupled to the light source, communications circuitry, and control circuitry. The housing includes an opening through which light from the light source is provided. The communications circuitry is configured to provide a wireless fixture location signal including a unique fixture identifier and associated with a fixture location signal strength. The control circuitry includes a memory storing instructions, which, when executed by the control circuitry cause the lighting fixture to provide the fixture location signal via the communications circuitry. Providing the fixture location signal allows nearby mobile devices to determine their position with respect to the lighting fixture, which may be useful in many situations.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 15 illustrates an exemplary user interface that may be used along with a lighting system according to an additional embodiment of the present disclosure.

FIGS. 16A through 16C illustrate exemplary user interfaces that may be used along with a lighting system according to an additional embodiment of the present disclosure.

DETAILED DESCRIPTION

Figure 1:
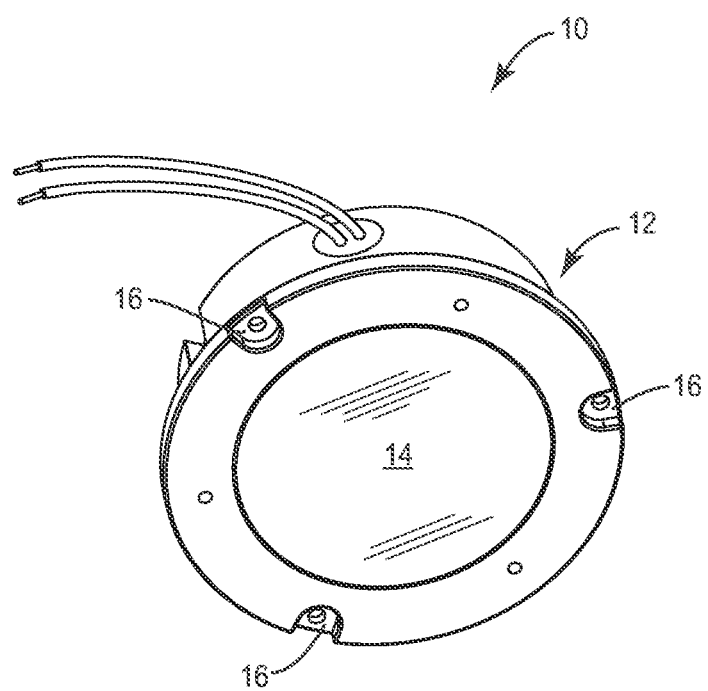
FIG. 1 illustrates a lighting fixture according to one embodiment of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The present disclosure relates to lighting fixtures and systems and methods of operating the same. In one embodiment, a lighting system includes a number of lighting fixtures and a lighting management system. Each one of the lighting fixtures may include communications circuitry, which may in turn include wireless communications circuitry such as Bluetooth wireless communications circuitry. The lighting fixtures may detect the proximal presence of one or more mobile devices, for example, by scanning for wireless signals from nearby mobile devices via the communications circuitry. Upon the detection of the proximal presence of one or more mobile devices, the lighting fixtures may perform any number of desired actions. For example, the lighting fixtures may change one or more light output settings thereof, may send a message to one or more additional lighting fixtures in the lighting system such that the additional lighting fixtures may change one or more light output settings thereof, may send a message to one or more additional devices remote to the lighting system such that the additional devices change one or more settings in response thereto, and/or may send a message to the lighting management system, which may in turn perform any number of different actions. The light output parameters may include a light intensity, color, and/or color temperature. The lighting fixtures may detect the proximal presence of the one or more mobile devices by determining a received signal strength of a Bluetooth wireless communications signal from each one of the one or more mobile devices.

In addition to or in replacement of the functionality described above with respect to the communications circuitry, the communications circuitry in each one of the lighting fixtures may provide a fixture location signal, which includes a unique identifier for the lighting fixture and is associated with a fixture location signal strength. A mobile device receiving the fixture location signal may use the unique identifier (which may be associated with information about the lighting fixture in the memory of the mobile device) and the fixture location signal strength to determine the proximity of the mobile device to the lighting fixture, and may take one or more desired actions upon determining that the mobile device is within a predetermined distance of the lighting fixture. In one embodiment, the unique identifier in the fixture location signal is used to look up relevant information about the lighting fixture, for example, the location thereof and one or more actions associated therewith, via a local network and/or the Internet.

The lighting management system may receive a message from a lighting fixture in the lighting system, the message indicating a proximal presence of a detected mobile device to the lighting fixture, and perform one or more actions in response to receipt of the message. For example, the lighting management system may log an event indicating the detection of the proximal presence of the mobile device by the lighting fixture, and/or may send one or more messages to lighting fixtures in the lighting system and other additional devices remote to the lighting system in order to facilitate a change of one or more settings therein.

Each one of the lighting fixtures in the lighting system may be associated with fixture location information, which describes a location of the lighting fixture. In such an embodiment, the messages provided from the lighting fixtures indicating the proximal presence of the detected mobile device to the lighting fixture may further include mobile device distance information describing a distance of the detected mobile device relative to the lighting fixture sending the message (which may be determined by examining the RSS of a signal emitted from the mobile device as discussed above). The lighting management system may log an event indicating the time that the detected mobile device was detected by the lighting fixture and the mobile device distance information in response to the receipt thereof.

In one embodiment, the lighting management system may facilitate the display of a user interface, either via a display attached directly to the lighting management system or via a remote device, showing an approximate location of the detected mobile device with relation to the lighting fixture. For example, the lighting management system may facilitate the display of a user interface showing an indicator on a map describing a space in which the lighting system is located, wherein the indicator shows the approximate location of the detected mobile device. In another embodiment, the lighting management system may facilitate the display of a user interface illustrating a number of detected mobile devices detected by a lighting fixture or lighting fixtures over a period of time and/or a frequency of detection of mobile devices by a lighting fixture or lighting fixtures over a period of time.

The lighting management system and/or one or more lighting fixtures in the lighting system may be configured to determine if a detected mobile device is associated with a settings profile. The settings profile may include settings preference information, which indicates one or more desired settings that should be implemented upon detection of the mobile device. If the detected mobile device is associated with such a settings profile, the lighting management system and/or the lighting fixture(s) may facilitate the implementation of the desired settings in the settings preference information. In one embodiment, the desired settings include light output settings for one or more lighting fixtures in the lighting system, or settings for one or more networked speakers, media players, set top boxes, appliances, HVAC systems, and the like.

In one embodiment, the lighting management system may facilitate the display of a user interface, either via a display attached directly to the lighting management system or via a remote device, such that the user interface allows for the creation of a settings profile associated with a mobile device. The settings profile may include settings preference information indicating one or more desired settings to be associated with a user of the mobile device such as light output settings from one or more lighting fixtures in the lighting system and/or settings or one or more additional devices such as networked speakers, media players, set top boxes, appliances, HVAC systems, and the like. As discussed above, these settings may be implemented upon detection of the proximal presence of the mobile device by one or more lighting fixtures in the lighting system.

In one embodiment, the lighting fixtures and/or the lighting management system are configured to monitor one or more settings of the lighting fixtures and/or one or more additional devices in order to generate suggested settings based thereon. For example, the lighting fixtures and/or the lighting management system may generate one or more suggested settings based on times that the lighting fixtures are generally turned on or off, either independently or in association with one or more additional devices.

The lighting management system may analyze a number of messages sent from different lighting fixtures in the lighting system to approximate a location of a detected mobile device within a space in which the lighting system is located. Further, the lighting management system may store the determined location of the detected mobile device, and may provide a user interface, either via a display attached directly to the lighting management system or via a remote device, to display information related to the location of the detected mobile device. In one embodiment, the lighting management system may analyze any number of messages from one or more lighting fixtures in the lighting system in order to determine a level of interest associated with a particular area in the space in which the lighting system is located. Determining a level of interest associated with a particular area may include determining the number of devices detected near one or more lighting fixtures within the area of interest and/or determining the amount of time each device was located near the one or more lighting fixtures within the area of interest. In general, analysis of the messages indicating the detection of one or more mobile devices may be used to characterize the space in which the lighting system is located.

FIG. 1 shows a lighting fixture 10 according to one embodiment of the present disclosure. The lighting fixture 10 includes a housing 12, which supports a light source (not shown) from which light is provided. A lens 14 covers the light source and may filter light emanating therefrom. An electronics module (not shown) may be located within the housing 12, and may include various circuitry, which will be described in detail below, configured to control one or more light output parameters of the light source and perform one or more additional functions. For example, the electronics module may include driver circuitry configured to provide a desired amount of current to one or more light emitting diodes (LEDs) in the light source in order to deliver a desired light intensity, light color, light color temperature, or the like. A reflector (not shown) may be attached to the housing 12, for example, via one or more mounting holes 16, which may extend the housing 12 such that the lighting fixture 10 may be used as a recessed lighting fixture for hanging in an opening in a ceiling.

Figure 2:
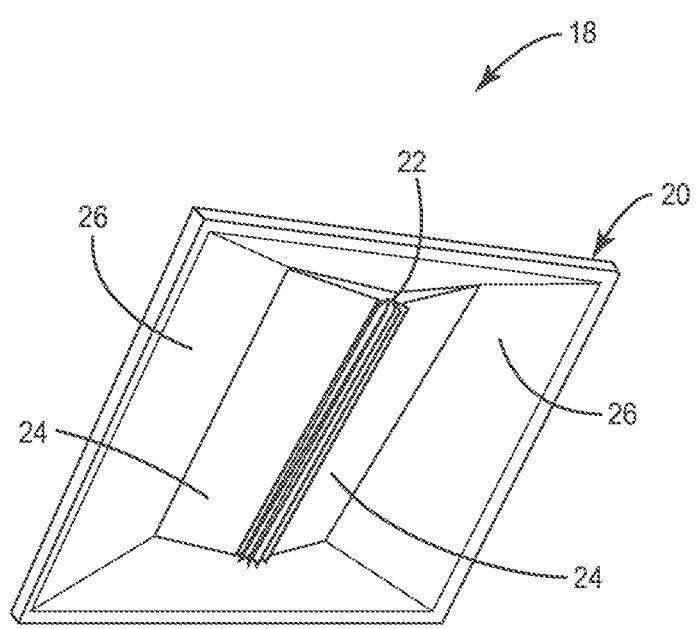
FIG. 2 illustrates a lighting fixture according to an additional embodiment of the present disclosure.

FIG. 2 shows a lighting fixture 18 according to an additional embodiment of the present disclosure. The lighting fixture 18 is substantially similar to that shown in FIG. 1, except that the lighting fixture 18 is a troffer-type lighting fixture. The lighting fixture 18 includes a housing 20, which supports a light source (not shown) from which light is provided. A heat sink 22 may be coupled to the light source in order to divert heat away from the light source. Light from the light source may be provided indirectly such that the light provided from the light source is reflected from an inside portion of the housing 20 and through a lens 24. The lens 24 may filter the light emanated from the light source. An outer surface 26 of the housing 20 may act as a reflector, directing light from the light source in a desired direction.

An electronics module (not shown) may be located within the housing 20, and may include various circuitry, which will be discussed in detail below, configured to control one or more light output parameters of the light source and perform one or more additional functions.

Figure 3:
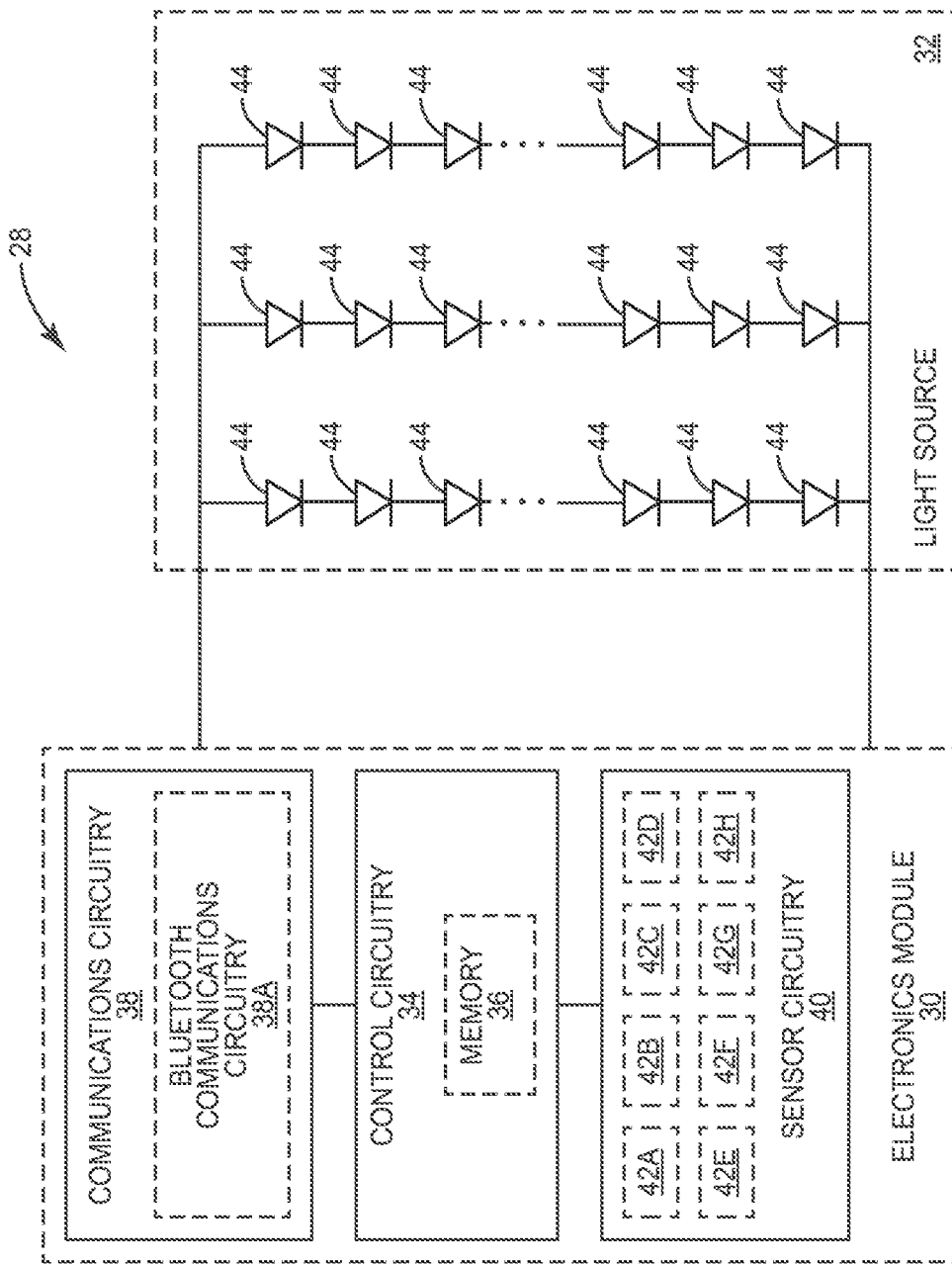
FIG. 3 illustrates a schematic representation of a lighting fixture according to one embodiment of the present disclosure.

FIG. 3 shows a schematic representation of a lighting fixture 28 according to one embodiment of the present disclosure. The lighting fixture 28 includes an electronics module 30 and a light source 32. The electronics module 30 includes control circuitry 34 (which in turn includes a memory 36), communications circuitry 38, and sensor circuitry 40. The control circuitry 34 may be the main control system for the lighting fixture 28. In some embodiments, the control circuitry 34 may be the main driver circuitry for the light source 32 such that the control circuitry 34 receives power, for example, from an AC power source, and provides a desired amount of current to the light source 32. The communications circuitry 38 is configured to communicate, either wirelessly or otherwise, with one or more additional lighting fixtures, one or more lighting management systems, and/or one or more other devices such as controls. In one embodiment, the communications circuitry 38 includes Bluetooth wireless communications circuitry 38A. The communications circuitry 38, and in some embodiments the Bluetooth wireless communications circuitry 38A, may be configured to detect the proximal presence of one or more mobile devices, as discussed in detail below. The sensor circuitry 40 may include any number of sensors. For example, the sensor circuitry 40 may include an ambient light sensor 42A, an occupancy sensor 42B, an imaging sensor 42C (i.e., a camera), a temperature sensor 42D, a humidity sensor 42E, a sound sensor 42F (i.e., a microphone), an accelerometer 42G, an energy consumption sensor 42H, and the like.

The light source 32 may include any number of LEDs 44 arranged in any fashion. For example, the light source 32 may include three strings of series-connected LEDs coupled in parallel with one another. The LEDs in each one of the series-connected strings may each be different types of LEDs, such that each of the different types of LEDs provides light having a different light intensity, color, and/or color temperature than the other. The light output from each one of the series-connected LED strings may combine to provide light having one or more desired light output characteristics, such as light intensity, color, and/or color temperature. In one embodiment, the light source 32 includes a first series-connected LED string including a number of blue-shifted yellow (BSY) LEDs, a second series-connected LED string including a number of blue-shifted green (BSG) LEDs, and a third series-connected LED string including a number of red (R) LEDs. A number of series or parallel-connected switches may be coupled to one or more of the LEDs 44 such that the current through the one or more LEDs can be independently controlled to produce a desired light output. While primarily discussed in terms of light intensity, color, and color temperature, any number of parameters of the light output of the lighting fixtures described herein may be changed based on the principles of the present disclosure. For example, a perceived vividness, a color saturation, or any other desired light output parameters may all be controlled based on the principles described herein.

Figure 4:
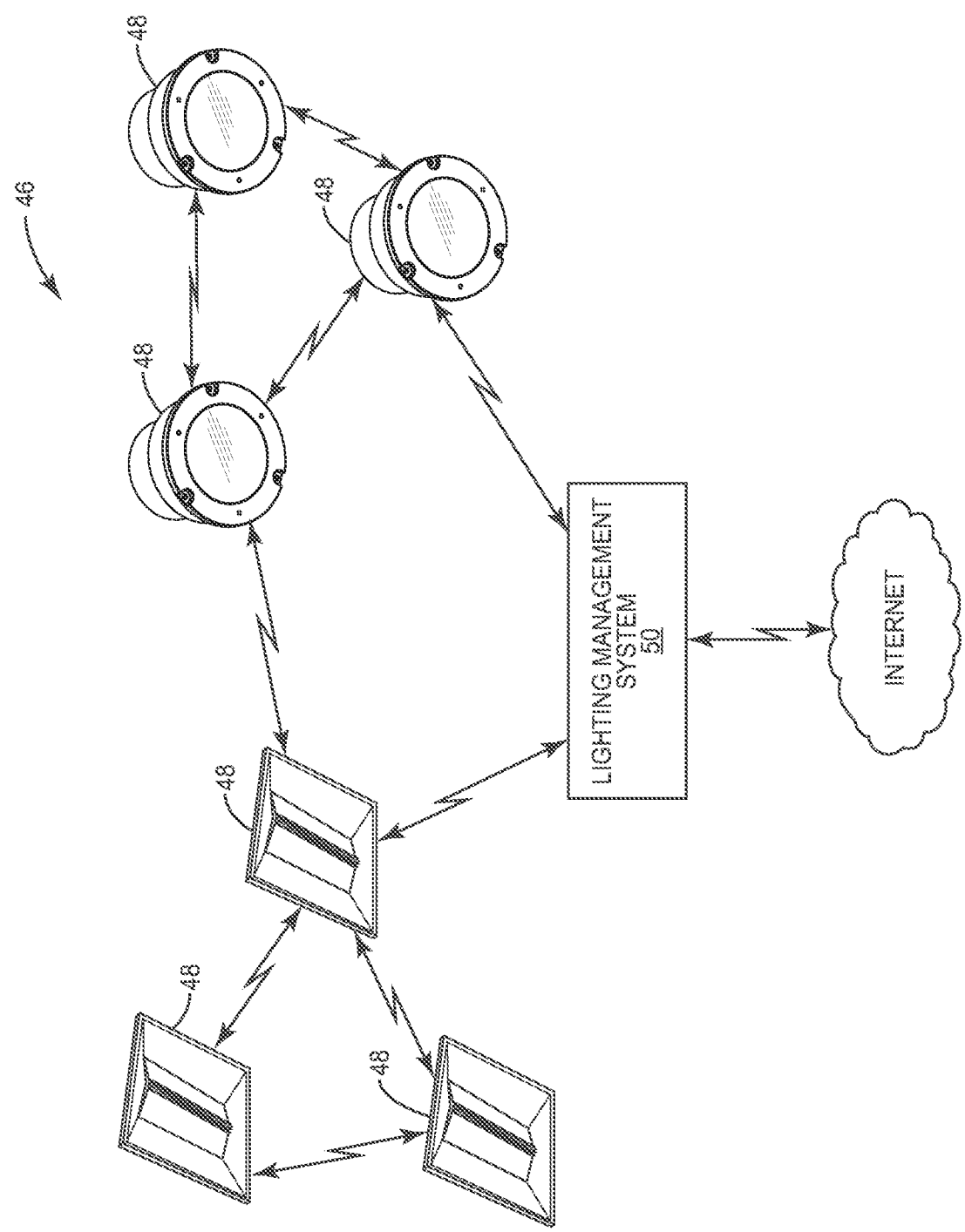
FIG. 4 illustrates a lighting system according to one embodiment of the present disclosure.

FIG. 4 shows a lighting system 46 according to one embodiment of the present disclosure. The lighting system 46 includes a number of lighting fixtures 48, which may be either the recessed-type lighting fixture described with respect to FIG. 1 or the troffer-type lighting fixture described with respect to FIG. 2. Further, the lighting system 46 includes a lighting management system 50. The lighting fixtures 48 may each be configured to communicate, wirelessly or otherwise, with one another and with the lighting management system 50. In one embodiment, the lighting fixtures 48 and the lighting management system 50 are part of a mesh wireless communications network. Accordingly, each one of the lighting fixtures 48 may only need to connect with one other lighting fixture 48 in the lighting system 46 in order to communicate with all of the devices in the lighting system 46, which may provide additional flexibility and reliability within the lighting system 46. The lighting management system 50 may be configured to communicate with the lighting fixtures 48 in order to collect data therefrom and/or provide commands thereto, as discussed in detail below. Further, the lighting management system 50 may include communications circuitry configured to connect with one or more additional devices, for example, via the Internet as shown. Accordingly, the lighting management system 50 may act as a gateway to the lighting system 46, allowing remote devices to control the lighting fixtures 48 or otherwise interface with the lighting system 46.

Figure 5:
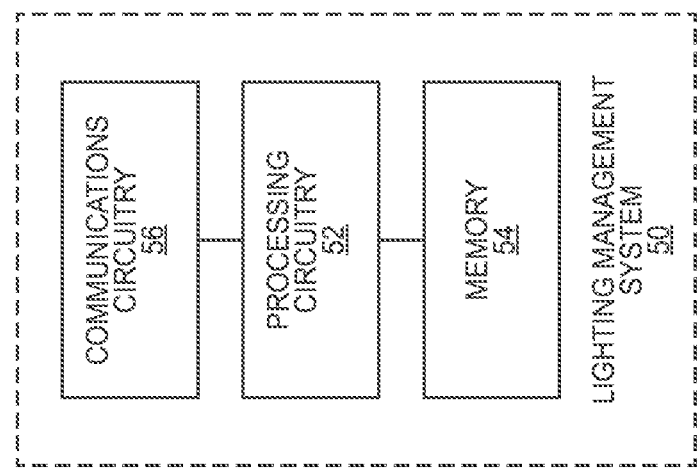
FIG. 5 illustrates a block diagram of a lighting management system according to one embodiment of the present disclosure.

FIG. 5 shows the lighting management system 50 according to one embodiment of the present disclosure. The lighting management system 50 includes processing circuitry 52, a memory 54, and communications circuitry 56. The processing circuitry 52 may be configured to execute one or more instructions stored in the memory 54 in order to provide certain functionality of the lighting management system 50 as discussed in detail below. The communications circuitry 56 may allow the lighting management system 50 to communicate, either wirelessly or otherwise, with the lighting fixtures 48 in the lighting system 46 or to one or more additional devices, for example, via the Internet.

Figure 6:
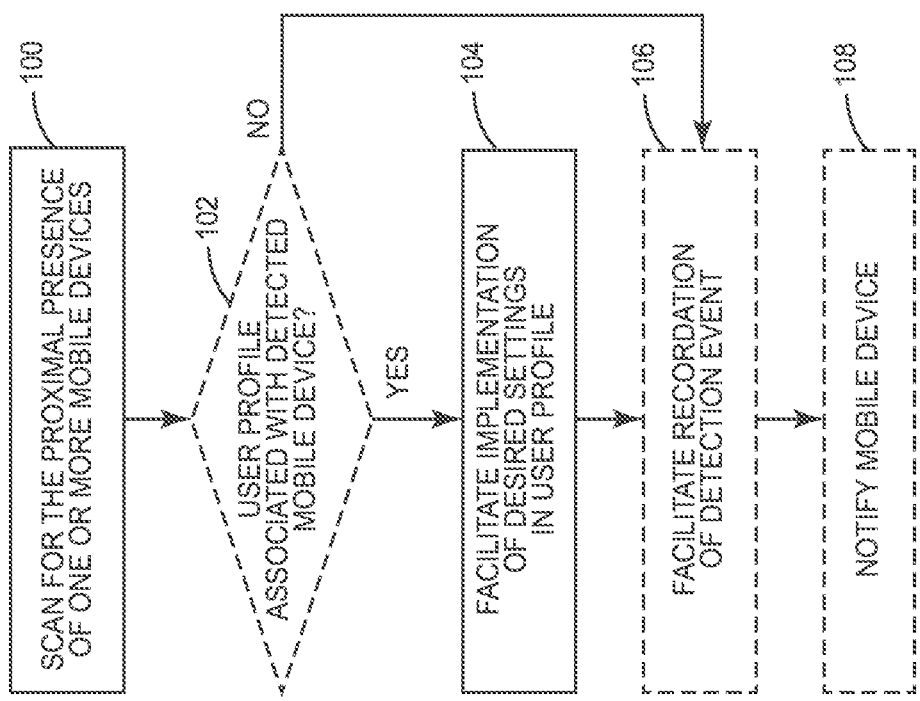
FIG. 6 is a flow diagram illustrating a method of operating a device in a lighting system according to one embodiment of the present disclosure.

FIG. 6 is a flow diagram illustrating a method of operating a lighting fixture 48 in the lighting system 46 according to one embodiment of the present disclosure. First, the lighting fixture 48 scans for the proximal presence of one or more mobile devices (step 100). Scanning for the proximal presence of one or more mobile devices may be accomplished in any number of ways. In one embodiment, the lighting fixture 48 scans for a Bluetooth signal from one or more discoverable mobile devices. However, detecting the proximal presence of one or more mobile devices may be accomplished by any number of different ways known in the art. In some embodiments, the lighting fixture 48 may further determine an approximate distance of a detected mobile device from the lighting fixture 48, for example, by determining the RSS of a signal provided by the mobile device. Details of Bluetooth signaling and device detection may be found in the Bluetooth Core Specification version 4.2, the contents of which are herein incorporated by reference in their entirety.

Next, the lighting fixture 48 may optionally determine if there is a settings profile associated with the detected mobile device (step 102). In some embodiments, the lighting fixture 48 may locally store settings profiles associated with one or more mobile devices. Alternatively, the lighting fixture 48 may send a message to query an additional device for a settings profile associated with a detected mobile device, such that the determination if there is a settings profile associated with a detected mobile device is performed remotely to the lighting fixture 48. The settings profile may store settings preference information, such as light output preferences for the lighting fixture 48 and one or more additional lighting fixtures 48 in the lighting system 46, as well as settings preference information for other devices which may be controlled by the lighting fixture. For example, the settings profile may store settings preference information for one or more networked speakers, media players, set top boxes, appliances, HVAC systems, and the like.

If there is a settings profile associated with the detected mobile device, and if the settings profile includes settings preference information, the lighting fixture 48 may then facilitate the implementation of one or more desired settings in the settings preference information (step 104). For example, the lighting fixture 48 may change one or more light output settings thereof (e.g., light intensity, color, and/or color temperature), may send one or more messages to additional lighting fixtures 48 in the lighting system 46 such that the additional lighting fixtures 48 change one or more light output settings thereof, may send one or more messages to additional devices in order to change the settings thereof, and/or may notify the lighting management system 50 of the detection of the mobile device such that the lighting management system 50 implements the desired settings. The lighting fixture 48 may then optionally facilitate recording of the detection event (step 106). For example, the lighting fixture 48 may store an identifier associated with the mobile device, a time of detection, and an approximate distance of the detected mobile device to the lighting fixture 48. Alternatively, the lighting fixture 48 may send a message to the lighting management system 50 or any other device indicating that the receiving device should store any of the information discussed above. If there is not a settings profile associated with the detected mobile device, step 104 may be skipped entirely. The lighting fixture 48 may also optionally notify the detected mobile device of the detection thereof, for example, by sending a message to the detected mobile device (step 108).

Figure 7:
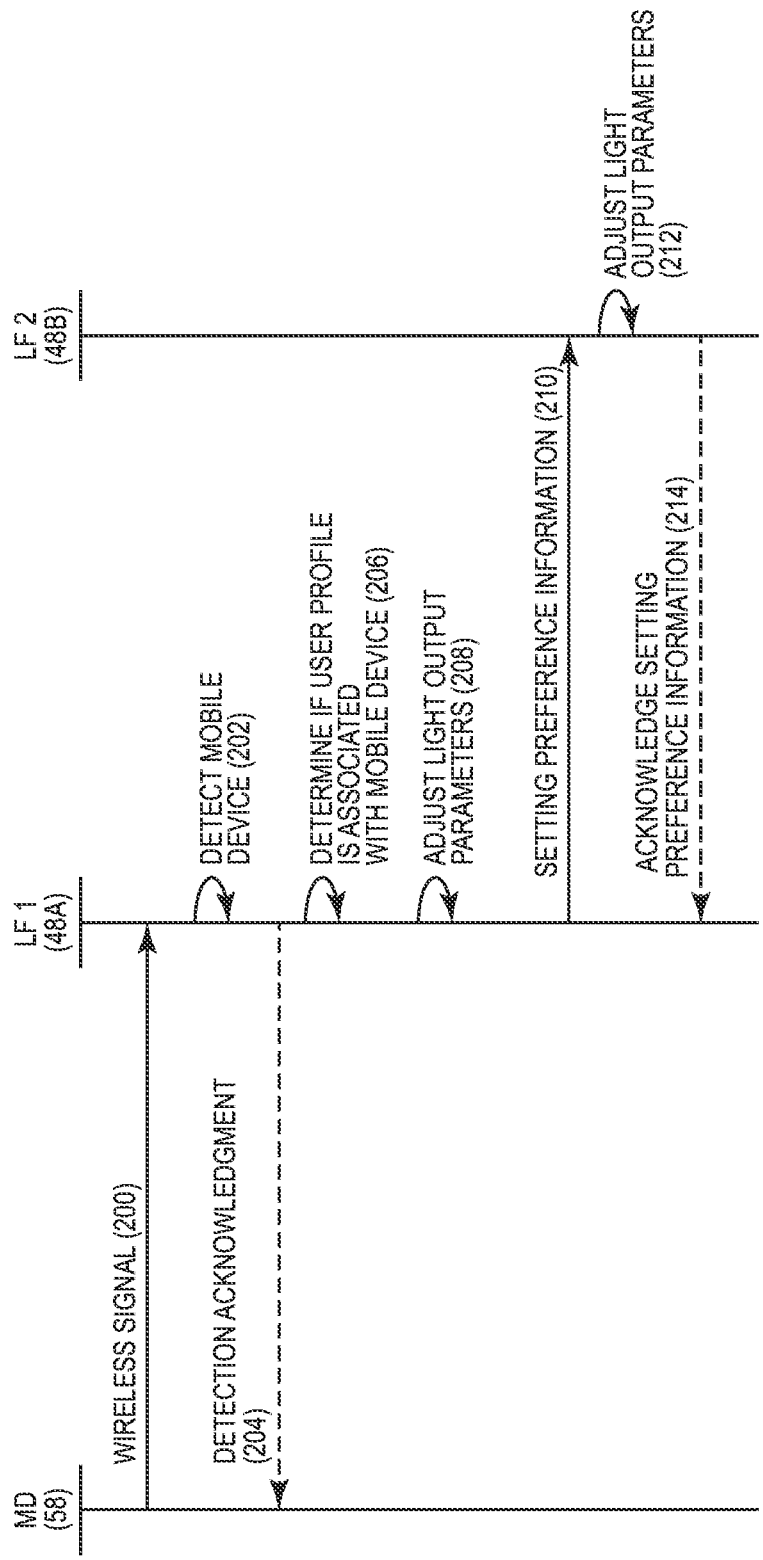
FIG. 7 is a diagram illustrating a communication flow between one or more lighting fixtures and a mobile device according to one embodiment of the present disclosure.

FIG. 7 is a diagram illustrating a communication flow between a first lighting fixture 48A, a second lighting fixture 48B, and a mobile device 58 according to on embodiment of the present disclosure. As discussed briefly above, the mobile device 58 may broadcast a Bluetooth signal indicating that the mobile device 58 is available for pairing (step 200). Alternatively, the mobile device 58 may have already paired with the first lighting fixture 48A in the past, and therefore may initiate pairing with the first lighting fixture 48A when it is in range thereof (also represented by step 200). The first lighting fixture 48A may therefore detect the proximal presence of the mobile device 58 (step 202). In response to the detection of the mobile device 58, the first lighting fixture 48A may optionally send a message to the mobile device 58 indicating that it has been detected (step 204). Further, the first lighting fixture 48A may determine if there is a settings profile associated with the mobile device 58 (step 206), and further may adjust one or more light output parameters based on settings preference information associated with the settings profile for the mobile device 58 (step 208). The first lighting fixture 48A may further send a message to the second lighting fixture 48B including all or a portion of the settings preference information (step 210). Alternatively, the first lighting fixture 48A may send a command to the second lighting fixture 48B to adjust the light output thereof. In response to the message from the first lighting fixture 48A, the second lighting fixture 48B may adjust one or more light output settings based on the settings preference information in the message (step 212). Further, the second lighting fixture 48B may optionally send an acknowledgement that the settings preference information was received and the settings implemented (step 214).

Figure 8:
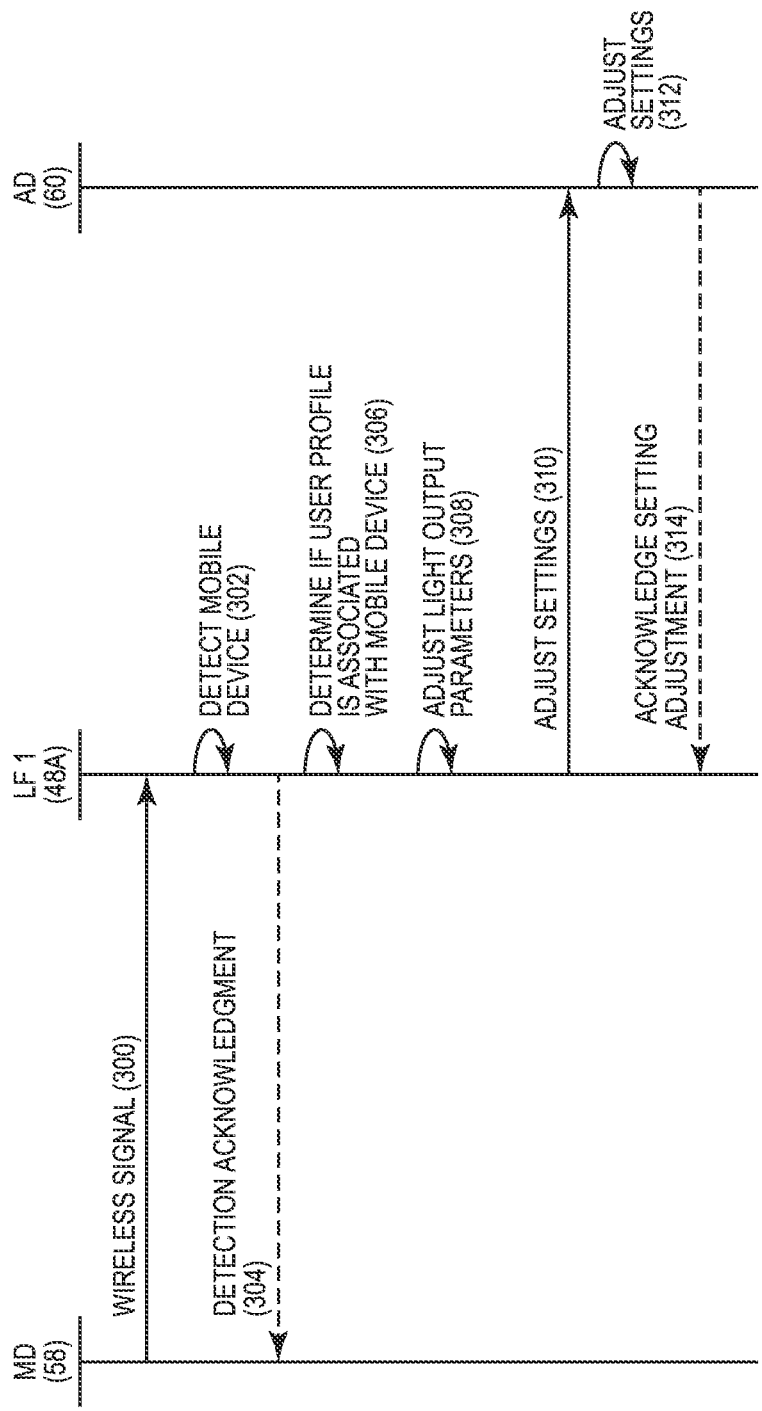
FIG. 8 is a diagram illustrating a communication flow between a lighting fixture, a mobile device, and an additional device according to one embodiment of the present disclosure.

FIG. 8 is a diagram illustrating a communication flow between the first lighting fixture 48A, the mobile device 58, and an additional device 60 according to one embodiment of the present disclosure. FIG. 8 is substantially similar to FIG. 7, wherein steps 300 through 308 are the same as steps 200 through 208 in FIG. 7. However, the second lighting fixture 48B in FIG. 8 is replaced with the additional device 60, which may be any number of different devices. For example, the additional device 60 may be a networked speaker, a media player, a set top box, an appliance, a thermostat, and the like. The first lighting fixture 48A may therefore send a command to the additional device 60 to adjust one or more settings thereof (step 310). For example, the first lighting fixture 48A may send a command to adjust the volume of a networked speaker, may send a command to adjust a temperature of a thermostat, or the like. The additional device 60 may then adjust the one or more settings as indicated (step 312), and further may optionally send an acknowledgement to the first lighting fixture 48A (step 314).

Figure 9:
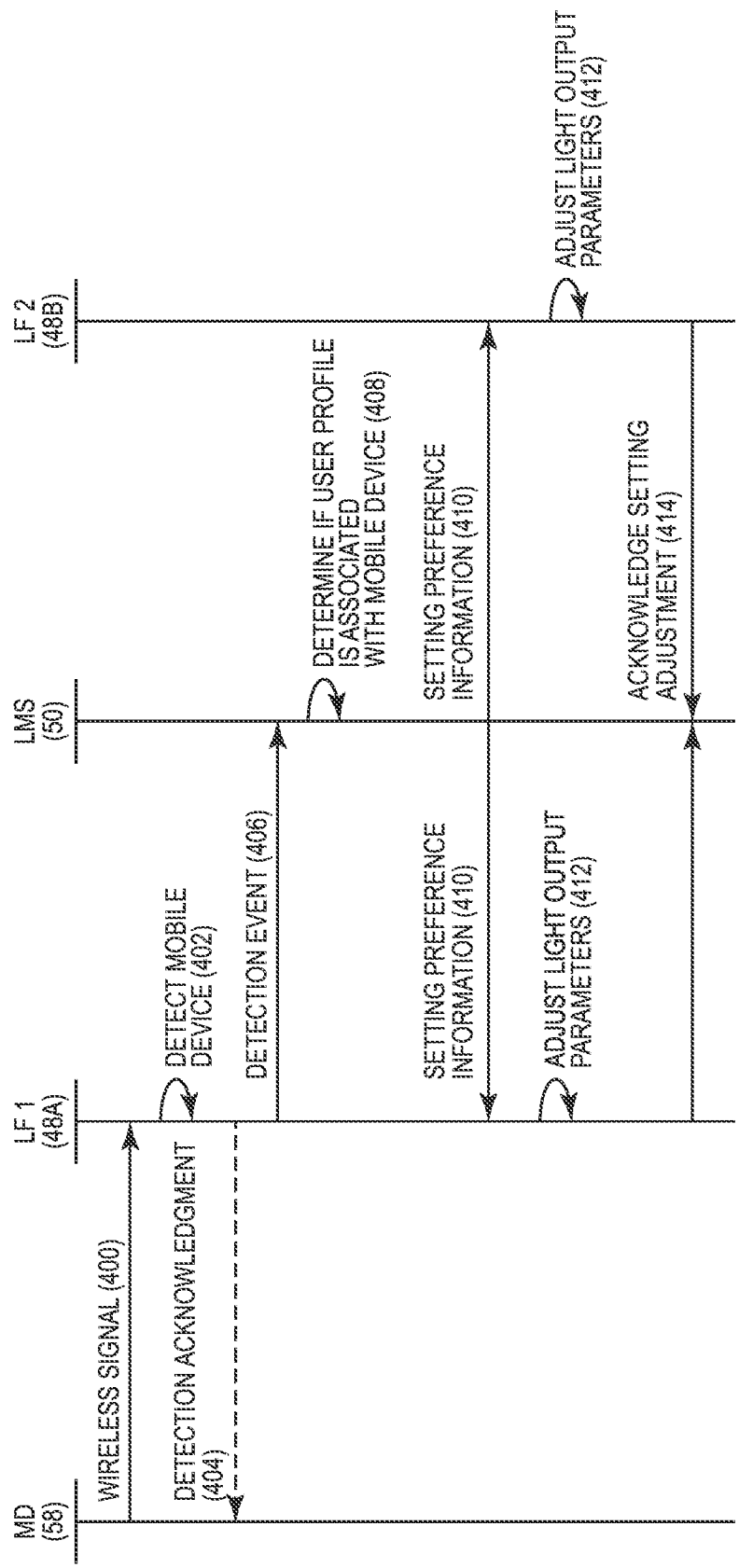
FIG. 9 is a diagram illustrating a communication flow between one or more lighting fixtures, a mobile device, and a lighting management system according to one embodiment of the present disclosure.

FIG. 9 is a diagram illustrating a communication flow between the first lighting fixture 48A, the second lighting fixture 48B, the lighting management system 50, and the mobile device 58 according to one embodiment of the present disclosure. FIG. 9 is substantially similar to FIG. 7, wherein steps 400 through 404 are the same as steps 200 through 204 in FIG. 7. However, the actions associated with detection of the mobile device 58 are offloaded to the lighting management system 50 in FIG. 9. Accordingly, upon detection of the mobile device 58, the first lighting fixture 48A sends a message to the lighting management system 50 indicating the detection of the mobile device 58 (step 406). In response to the message, the lighting management system 50 determines if the mobile device 58 is associated with a settings profile (step 408). If the mobile device 58 is associated with a settings profile, the lighting management system 50 then sends a message to the first lighting fixture 48A and the second lighting fixture 48B including all or a portion of settings preference information (step 410) as discussed above. The first lighting fixture 48A and the second lighting fixture 48B may in turn adjust the light output parameters thereof in order to reflect one or more desired settings in the settings preference information (step 412), and further may optionally acknowledge adjusting their settings (step 414). Alternatively, the lighting management system 50 may send a command to each one of the first lighting fixture 48A and the second lighting fixture 48B instructing them to adjust the light output thereof.

Figure 10:
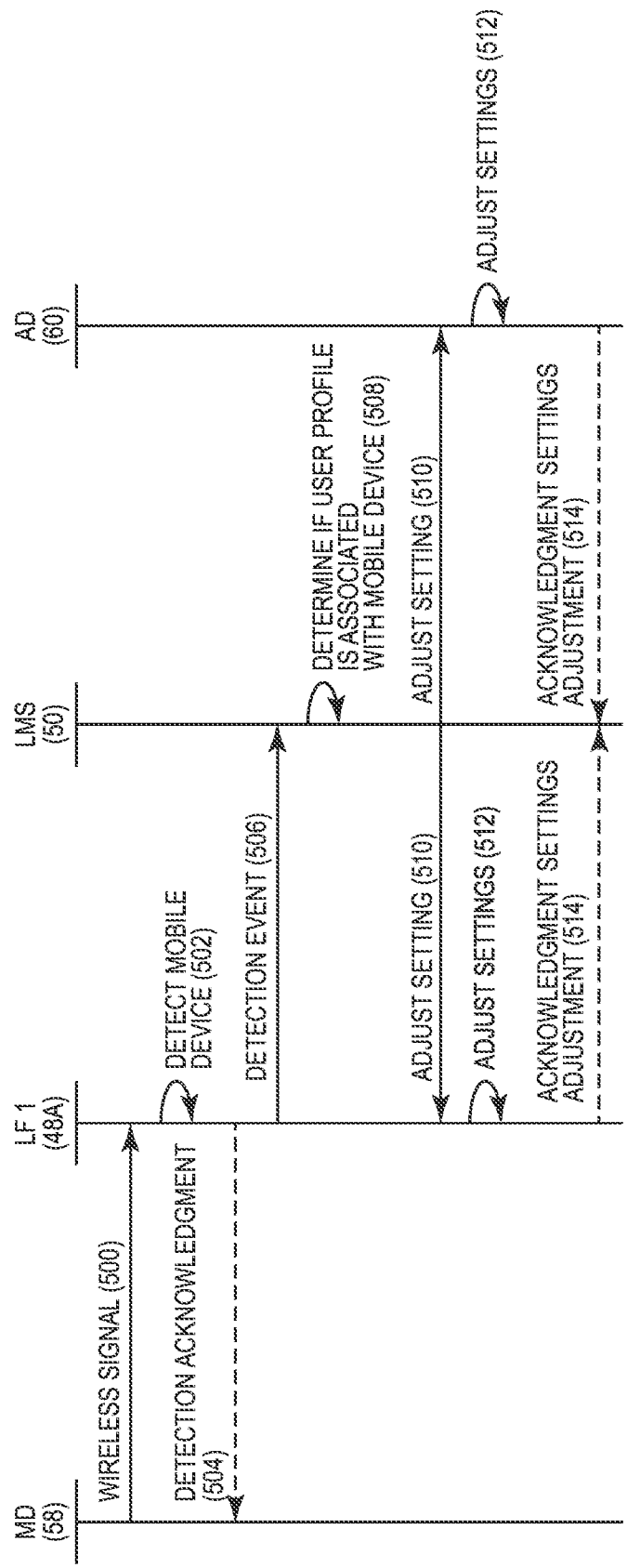
FIG. 10 is a diagram illustrating a communication flow between one or more lighting fixtures, a mobile device, and a lighting management system according to an additional embodiment of the present disclosure.

FIG. 10 is a diagram illustrating a communication flow between the first lighting fixture 48A, the lighting management system 50, the mobile device 58, and the additional device 60 according to one embodiment of the present disclosure. FIG. 10 is substantially similar to FIG. 9, with steps 500 through 508 being the same as steps 400 through 408 in FIG. 9. However, the second lighting fixture 48B is replaced with the additional device 60 in FIG. 10. Accordingly, the lighting management system 50 sends a message to the first lighting fixture 48A and the additional device 60 indicating one or more settings to change based on the settings preferences information associated with the settings profile for the mobile device 58 (step 510). The first lighting fixture 48A and the additional device 60 then adjust the settings thereof as instructed (step 512), and optionally may send an acknowledgement thereof to the lighting management system 50 (step 514). Notably, the principles described in FIGS. 7-10 may be combined in any way in order to effectuate the functionality of the lighting system 46 as discussed above.

Figure 11:
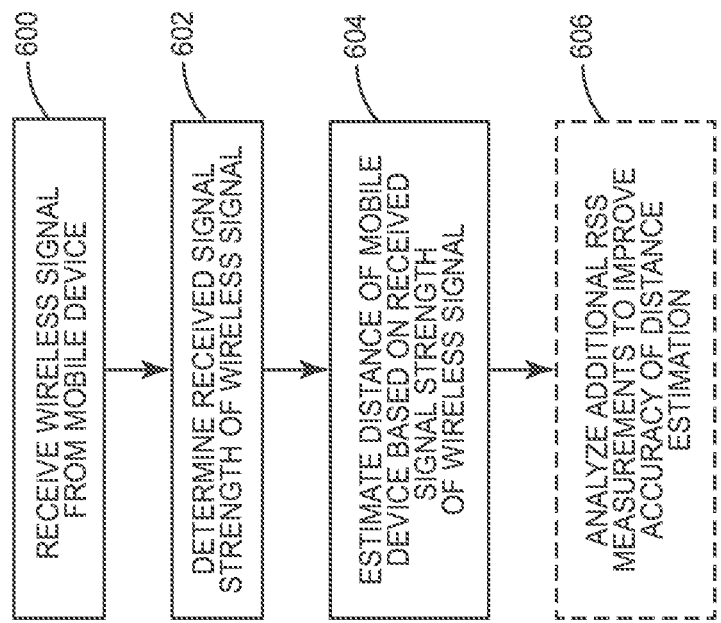
FIG. 11 is a flow diagram illustrating a method of operating a device in a lighting system according to an additional embodiment of the present disclosure.

As discussed above, one or more lighting fixtures 48 in the lighting system 46 may be configured to determine a distance of a mobile device therefrom. Accordingly, FIG. 11 is a flow diagram illustrating a method for determining a distance of a mobile device from a lighting fixture 48. First, the lighting fixture 48 receives a wireless signal from the mobile device (step 600). In one embodiment, the wireless signal is a Bluetooth wireless signal, as discussed above. The lighting fixture 48 then determines a received signal strength (RSS) of the wireless signal (step 602). A distance of the mobile device from the lighting fixture 48 is then estimated based on the RSS (step 604). For example, the RSS may be compared to one or more values in a look-up-table to determine an approximate distance of the mobile device 58 from the lighting fixture 48. In some embodiments, distance approximations from multiple lighting fixtures 48 may then be analyzed in order to better approximate a location of the mobile device, for example, via triangulation (step 606).

Figure 12:
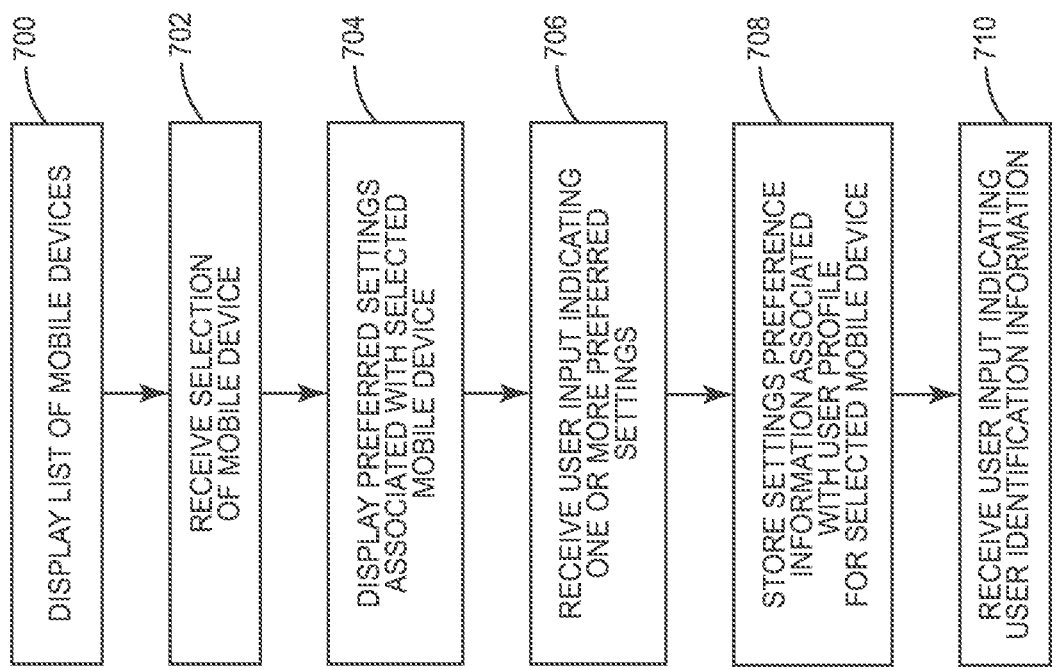
FIG. 12 is a flow diagram illustrating a method of operating a device in a lighting system according to an additional embodiment of the present disclosure.

As discussed above, a settings profile may be associated with a mobile device in order to implement one or more preferred settings upon detection of the mobile device. Accordingly, FIG. 12 is a flow diagram illustrating a method of associating a settings profile with a mobile device according to one embodiment of the present disclosure. First, a list of mobile devices is displayed (step 700). For example, instructions may be provided to a display, such that the display shows the list of mobile devices. Next, a selection of a mobile device from the list of mobile devices is received (step 702). For example, a selection of a mobile device may be received by a user input peripheral or from a remote device via the Internet. In one embodiment, receiving the selected mobile device may pair the mobile device with one or more of the lighting fixtures 48 in the lighting system 46, for example, via a Bluetooth pairing process. A number of different preferred settings to be associated with the selected mobile device are displayed (step 704). For example, a number of light output settings for various lighting fixtures 48 in the lighting system 46 may be displayed along with a number of preferred settings for any other devices. User input indicating the one or more preferred settings is then received (step 706) and stored as settings preference information associated with the settings profile and the mobile device (step 708). In some embodiments, the settings profile may be associated with user information, such as a user name, a gender, a birth date, an address, and the like. Accordingly, user input indicating user identification information is received (step 710) in some embodiments. Notably, the foregoing steps are merely illustrative, and a settings profile may be associated with a mobile device in any number of different ways. In one embodiment, the steps shown in FIG. 12 are performed by the lighting management system 50. In an additional embodiment, the steps shown in FIG. 12 are performed by a remote device (not shown).

Figure 13:
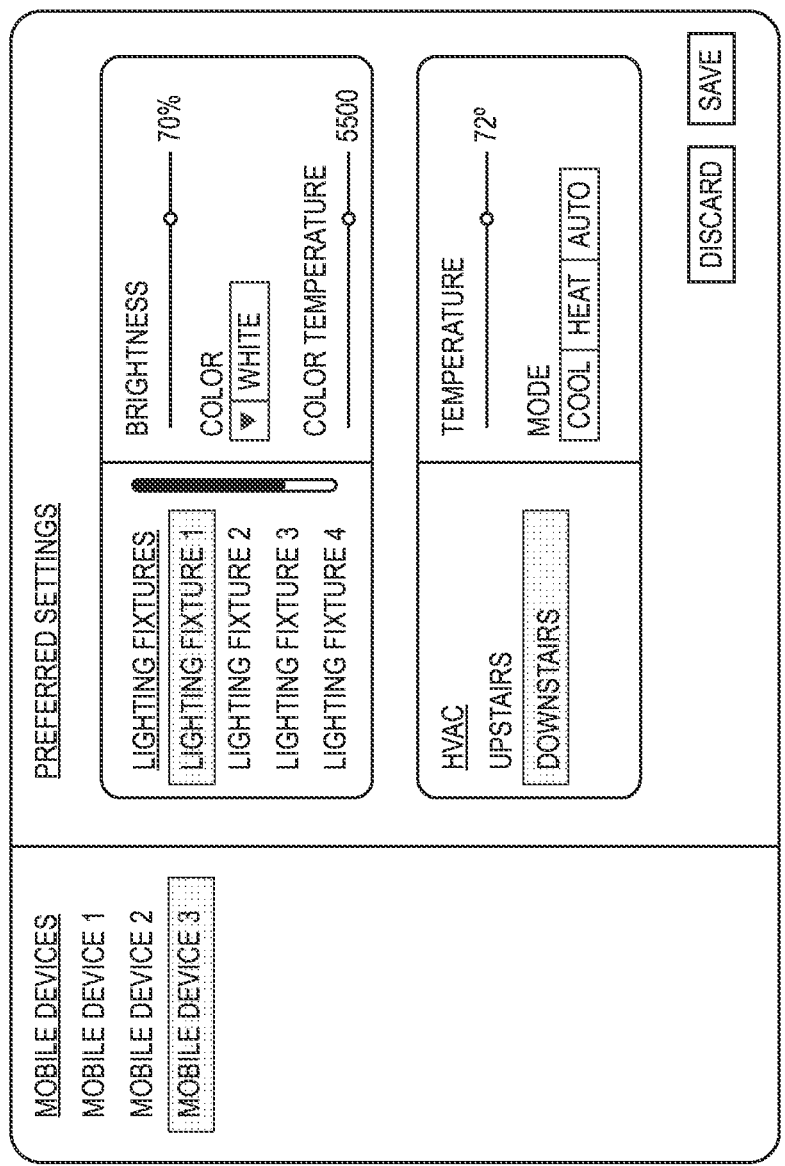
FIG. 13 illustrates an exemplary user interface that may be used along with a lighting system according to one embodiment of the present disclosure.

FIG. 13 shows an exemplary user interface that may be used to associate a mobile device with a settings profile. Notably, the user interface shows a list of mobile devices. For a selected mobile device, the user interface shows a number of different preferred settings to be associated with the selected mobile device. A user input peripheral may be used to make selections and provide input to the user interface, including saving a particular settings profile associated with a mobile device. Notably, the user interface shown in FIG. 13 is merely exemplary, and any number of different user interfaces may be used without departing from the principles of the present disclosure.

Figure 14:
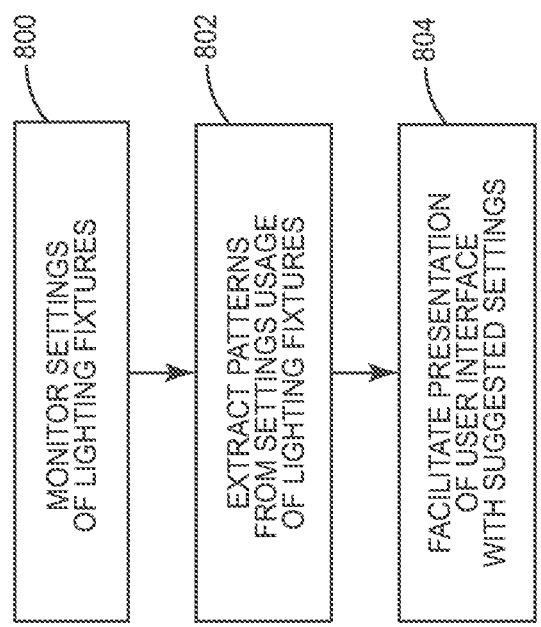
FIG. 14 is a flow diagram illustrating a method for determining one or more suggested settings for a lighting system according to one embodiment of the present disclosure.

While FIG. 13 illustrates an exemplary way to associate a settings profile with a mobile device, a user may often be unaware of particular preferences for lighting and/or other devices that are often implemented by the user. For example, a user may often set the lights to a certain intensity, color, and/or color temperature at or near the same time every day, however, due to habit, may forget his or her preference for doing so. As an additional example, a user may turn on music every day upon his or her arrival at home. One or more of the lighting fixtures 48, the lighting management system 50, and/or a remote device may monitor settings such as light output settings and the like and analyze them to extract patterns therefrom. These patterns may then be presented to a user via a user interface or implemented automatically without any action required from a user. Accordingly, FIG. 14 is a flow diagram illustrating a method of determining a number of suggested settings for the lighting fixtures 48 according to one embodiment of the present disclosure. First, the settings of each one of the lighting fixtures 48 are monitored for a period of time (step 800). One or more patterns are then extracted from the settings of each one of the lighting fixtures 48 (step 802). These patterns may be independent to the lighting fixtures 48 or may be in reference to other devices that are capable of being monitored by the lighting system 46. For example, the lighting management system 50 or any other device associated with the lighting system 46 may be capable of receiving infrared signals, wireless networking signals, and/or wired networking signals in order to monitor the status of devices remote to the lighting system 46. Accordingly, the lighting system 46 may be capable of determining, for example, when a television is turned on with reference to the light output settings of the lighting fixtures 48 in the lighting system 46. In one exemplary embodiment, the lighting system 46 may determine that the light output settings of one or more lighting fixtures 48 are set to a particular value at or around the same time each day, and therefore suggest that said light output settings be implemented automatically in the future. As an additional example, the lighting system 46 may determine that the light output settings of one or more lighting fixtures 48 are often adjusted to a particular value when a television is turned on, and thus may suggest that such settings be implemented automatically in the future. Finally, a user interface may be provided, either directly or indirectly, to display the suggested settings and allow for their implementation (step 804). As discussed above, said user interface may be shown by providing instructions to a display attached to the lighting management system 50 or may be provided by a remote device in communication with the lighting management system 50.

FIG. 15 shows an exemplary user interface that may be used to display and allow for the implementation of one or more suggested settings determined by the lighting system 46 as discussed above. As shown, a list of suggested settings is presented, with an option for a user to either delete the suggested settings or implement the suggested settings. Notably, such a user interface is only exemplary and many other ways of presenting the same information may be accomplished without departing from the principles of the present disclosure.

Figure 16A:
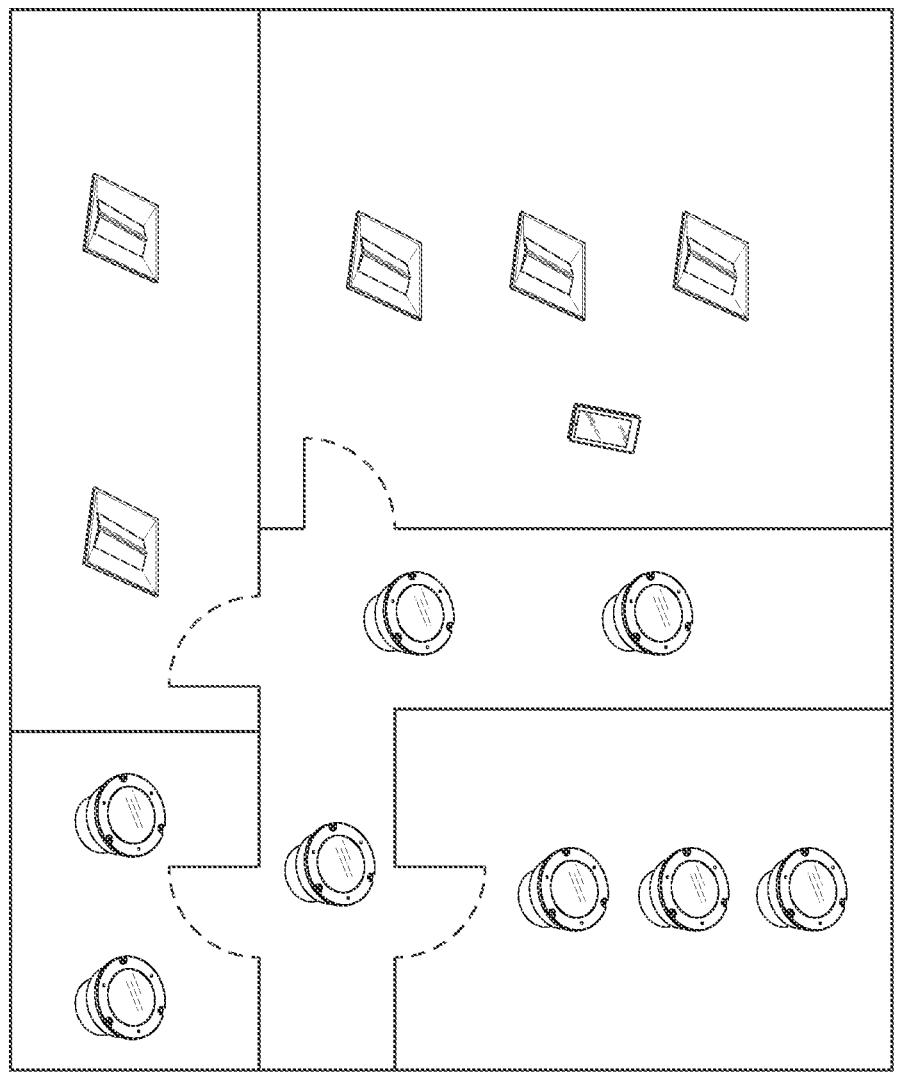

In some embodiments, each lighting fixture 48 in the lighting system 46 may be associated with fixture location information describing the location of the lighting fixture 48. Details of associating fixture location information with lighting fixtures 48 in the lighting system 46 is described in co-pending U.S. patent application Ser. No. 14/826,892, now U.S. Pat. No. 9,750,112, the contents of which are herein incorporated by reference in their entirety. If the location of each one of the lighting fixtures 48 is known, and if the distance between each lighting fixture 48 and a mobile device is known, an approximate location of the mobile device may be obtained and displayed, for example, as an indicator on a map. Accordingly, FIG. 16A shows an exemplary user interface showing a map of a space in which the lighting system 46 is located. As shown, the map includes a number of different locations, each separated by a line. The map may describe the space in terms of spatial coordinates, such that each one of the different locations is associated with a set of the spatial coordinates. The lighting fixtures 48 are shown distributed throughout the map in various locations therein. Specifically, each one of the lighting fixtures 48 is shown in the set of spatial coordinates corresponding to the location in which they are located. An indicator showing the approximate location of the mobile device is shown on the map at the approximate spatial coordinates corresponding thereto. While only one mobile device is shown in the user interface of FIG. 16A, multiple mobile devices may be shown using a similar approach. As discussed above, the fixture location information and mobile device distance information from multiple lighting fixtures 48 may be used to better approximate the location of the mobile device in various embodiments. If user information such as a user name is associated with a settings profile for the mobile device 58, it may be possible to locate a particular individual using the above approach. Such a feature may be useful, for example, when searching for a colleague that is often not at his or her desk in the office.

Figure 16C:
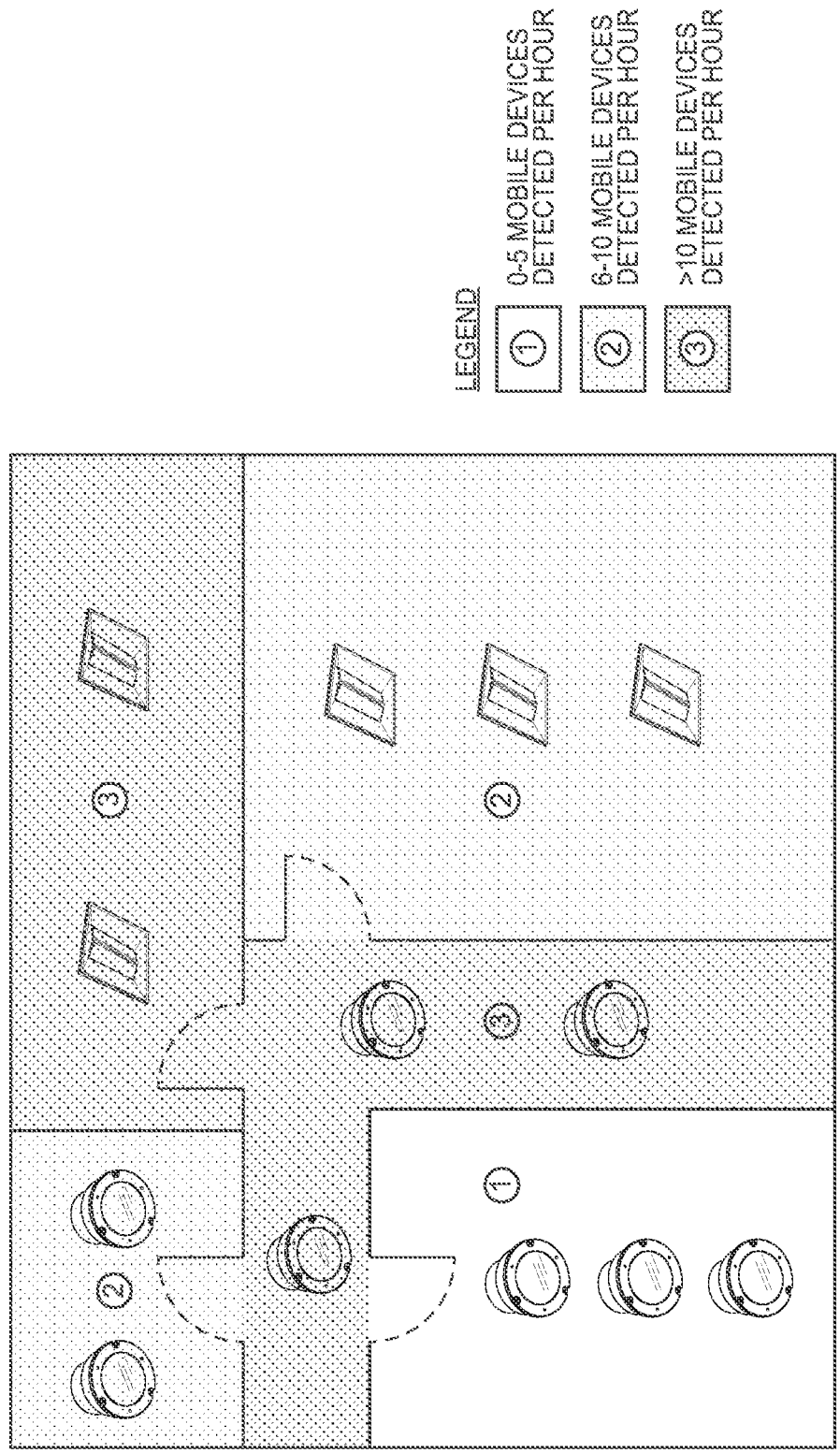

FIG. 16B shows a similar user interface to that shown in FIG. 16A, except that instead of showing an indicator of the approximate location of a mobile device, the user interface displays an indicator of the number of mobile devices detected within a location over a period of time. As shown, shading in each one of the locations may indicate the number of mobile devices currently detected within that location, or may indicate the number of unique mobile devices detected in the location for a given period of time. Darker shading may indicate a larger number of detected mobile devices than lighter shading. While the results are averaged for each location in the map, the user interface may also display results with greater granularity based on the information obtained from each individual lighting fixture 48. FIG. 16C shows a similar user interface to that of FIG. 16B, except that instead of showing the number of mobile devices detected within a location over a period of time, the user interface displays an average time that each detected mobile device has spent in a location over a period of time. As shown, shading in each one of the locations may indicate the average amount of time that each detected mobile device spent in that location. Such a measurement may be useful, for example, when determining traffic patterns within a building or the level of consumer interest in a retail display, which may be located at a particular location in a space.

As discussed above, areas of interest may be associated with a space in which the lighting system 46 is located. Any of the above information, such as the number of mobile devices, the frequency of detection of the mobile devices, the amount of time a mobile device is detected in a particular area, or the like, may be analyzed and used to determine the level of interest in the areas of interest. For example, the number of mobile devices and/or the amount of time that each mobile device is detected within an area of interest may be indicative of a level of consumer interest, for example, in a retail display. User identification information associated with a particular mobile device may be analyzed along with the location information obtained about the mobile device to track a user's preferences or construct a profile about the user, which may be used to provide targeted advertisements, targeted information, or the like, to the user.

Figure 17:
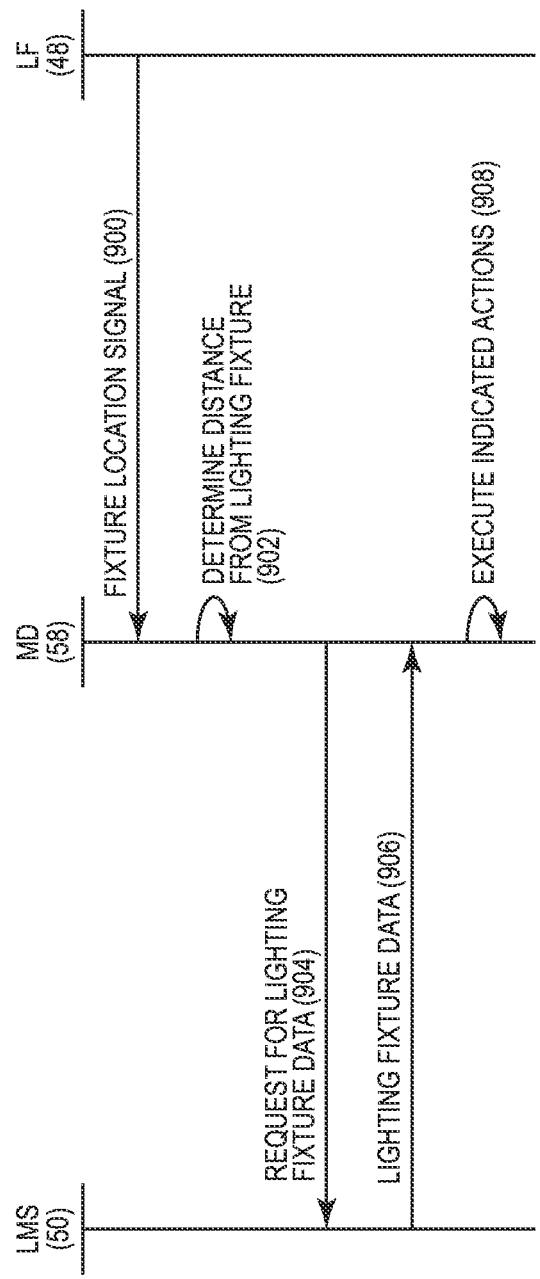
FIG. 17 is a diagram illustrating a communication flow between a lighting fixture, a mobile device, and a lighting management system according to an additional embodiment of the present disclosure.

In addition to or in place of the functionality described above, one or more of the lighting fixtures 48 in the lighting system 46 may also be configured to provide a fixture location signal. The fixture location signal may include a unique identifier for the lighting fixture and be associated with a fixture location signal strength. Accordingly, a mobile device may receive the fixture location signal and use it, for example, to determine a location of the mobile device in an indoor space or to take one or more actions. Accordingly, FIG. 17 is a diagram illustrating a communication flow between a lighting fixture 48 in the lighting system 46, the lighting management system 50, and the mobile device 58. First, the lighting fixture 48 provides the fixture location signal via the communications circuitry 38 (step 900). In one embodiment, the fixture location signal is a Bluetooth beacon signal and thus may be provided via the Bluetooth wireless communications circuitry 38A. For example, the fixture location signal may be a Bluetooth low energy signal. The mobile device 58 receives the fixture location signal, which includes a unique identifier and is associated with a fixture location signal strength, and determines a distance of the mobile device 58 from the lighting fixture 48 by analyzing the fixture location signal strength (step 902). The mobile device 58 may also send a request to the lighting management system 50, either via a local network or via the Internet, requesting data about the lighting fixture 48 based on the unique identifier (step 904). In response, the lighting management system 50 may provide information about the lighting fixture 48, for example, the location thereof, and any actions that should be taken when within a predetermined distance from the lighting fixture 48 (step 906). In response, the mobile device 58 may execute the indicated actions (step 908). For example, the mobile device 58 may display an advertisement, may show a map of a space in which the mobile device 58 is located, or the like. In other embodiments, the mobile device 58 may store information about the lighting fixture 48 in local memory, for example, due to the fact that the mobile device 58 includes an application associated with the lighting system 46. Accordingly, the mobile device 58 may simply retrieve said information from memory without requiring any communication with the lighting management system 50 and execute any actions associated therewith.

Those skilled in the art will recognize improvements and modifications to the preferred embodiments of the present disclosure. All such improvements and modifications are considered within the scope of the concepts disclosed herein and the claims that follow.

What is claimed is:

1. A lighting fixture, comprising:
a light source;
communications circuitry; and
processing circuitry configured to:
   detect a proximal presence of a mobile device via the communications circuitry;
   after detecting the proximal presence of the mobile device, determine a distance of the mobile device relative to the lighting fixture; and
   upon determining that the distance of the mobile device is within a predetermined distance of the lighting fixture, execute one or more desired actions associated with the mobile device, wherein the one or more desired actions comprise adjusting one or more light output parameters of the light source.

2. The lighting fixture of claim 1, wherein executing the one or more desired actions comprises causing a nearby lighting fixture to turn on and adjust the one or more light output parameters of a corresponding light source.

3. The lighting fixture of claim 1, wherein the one or more light output parameters comprise at least one of a non-binary light intensity, a color, or a color temperature.

4. The lighting fixture of claim 3, wherein the one or more desired actions further comprise causing the communications circuitry to send a message to one or more additional lighting fixtures with instructions to adjust a light output thereof.

5. The lighting fixture of claim 1, wherein the one or more desired actions further comprise logging an event indicating the detection of the proximal presence of the mobile device by the lighting fixture.

6. The lighting fixture of claim 5, wherein logging the event indicating the detection of the proximal presence of the mobile device comprises storing a time that the mobile device was detected and the distance of the mobile device relative to the lighting fixture.

7. The lighting fixture of claim 1, wherein the one or more desired actions further comprise forwarding at least a portion of the one or more desired actions to one or more additional lighting fixtures.

8. The lighting fixture of claim 1, wherein the one or more desired actions further comprise forwarding at least a portion of the one or more desired actions to one or more additional devices.

9. The lighting fixture of claim 1, wherein the processing circuitry is further configured to cause a display to provide a user interface displaying a visual representation showing an approximate location of the mobile device with relation to the lighting fixture over time.

10. The lighting fixture of claim 9, wherein the visual representation is an indicator on a map.

11. The lighting fixture of claim 1, wherein the processing circuitry is further configured to cause a display to provide a user interface displaying a visual representation illustrating a number of detected mobile devices in a period of time.

12. The lighting fixture of claim 1, wherein the processing circuitry is further configured to cause a display to provide a user interface displaying a visual representation of a frequency of detection of one or more mobile devices in a period of time.

13. The lighting fixture of claim 1, wherein the distance of the mobile device relative to the lighting fixture is determined by analyzing a signal strength of a signal emitted from the mobile device.

14. A light system, comprising:
communications circuitry;
sensor circuitry; and
processing circuitry configured to:
   detect a proximal presence of a mobile device;
   after detecting the proximal presence of the mobile device, determine a distance of the mobile device relative to the light system via the sensor circuitry; and
   upon determining that the distance of the mobile device is within a predetermined distance of the light system, execute one or more desired actions associated with the mobile device, wherein the one or more desired actions comprise adjusting one or more light output parameters of the light system.

15. The light system of claim 14, further comprising a lighting fixture comprising a light source, wherein the lighting fixture is associated with fixture location information describing a location of the lighting fixture.

16. The light system of claim 15, further comprising a lighting management system remote from and in communication with the lighting fixture, wherein the lighting management system comprises the processing circuitry.

17. The light system of claim 16, wherein the processing circuitry is further configured to cause the lighting management system to store the distance of the mobile device relative to the light source.

18. The light system of claim 16, wherein the lighting management system is coupled to a display providing a user interface.

19. The light system of claim 18, wherein the processing circuitry is further configured to instruct the display to show a location of the mobile device over time.

20. The light system of claim 14, wherein the processing circuitry is further configured to track locations of the mobile device relative to the light source and one or more additional light sources over time.

21. The light system of claim 20, wherein the processing circuitry is further configured to analyze the locations of the mobile device over time in order to determine a level of interest associated with one or more areas of interest.

* * * * *